US005988617A

United States Patent [19]

Kyte et al.

[11] Patent Number: 5,988,617

[45] Date of Patent: Nov. 23, 1999

[54] BLADE-CHANGING WORK TABLE AND BLADE COVER

[75] Inventors: Joe G. Kyte, Deer Park; Jesus Soria; Antonio Reynoso, both of Houston, all of Tex.

[73] Assignee: Phillips Petroleum Company, Bartlesville, Okla.

[21] Appl. No.: 08/863,904

[22] Filed: May 27, 1997

[51] Int. Cl.[6] .......... B23Q 1/00

[52] U.S. Cl. .......... 269/47; 269/909

[58] Field of Search .......... 269/17, 47, 48, 269/909, 290, 287; 312/208.6

[56] References Cited

U.S. PATENT DOCUMENTS

| | | | |
|---|---|---|---|
| 310,438 | 1/1885 | Jones | 312/208.6 |
| 758,779 | 5/1904 | Remsberg | 269/17 |
| 1,033,758 | 7/1912 | Howell | 269/47 |
| 4,062,111 | 12/1977 | Clark | 30/139 |
| 4,095,778 | 6/1978 | Wing | 269/71 |
| 4,204,446 | 5/1980 | Knochel | 83/146 |
| 4,251,198 | 2/1981 | Altenburg | 425/67 |
| 4,284,286 | 8/1981 | Lewallen | 280/30 |
| 4,360,168 | 11/1982 | Peterson, Jr. | 241/294 |
| 4,500,271 | 2/1985 | Smith | 425/67 |
| 4,502,518 | 3/1985 | Lewin | 144/286 |
| 4,530,204 | 7/1985 | Brooks | 56/298 |
| 5,052,911 | 10/1991 | Mikeska | 425/56 |
| 5,101,704 | 4/1992 | Jones et al. | 83/174 |
| 5,209,053 | 5/1993 | Verbeek | 56/298 |
| 5,239,934 | 8/1993 | Miller et al. | 108/44 |
| 5,292,240 | 3/1994 | Capelle | 425/142 |
| 5,330,340 | 7/1994 | Suppon et al. | 425/142 |

*Primary Examiner*—Timothy V. Eley
*Assistant Examiner*—Benjamin M. Halpern
*Attorney, Agent, or Firm*—Ryan N. Cross

[57] ABSTRACT

A work table and blade cover are provided to assist in changing the blades on a pelletizer blade holder. The work table employs a tabletop and a shaft integrally connected to the tabletop. The shaft is threaded along at least a portion of its length and is sized to be received through the central aperture of the blade holder. A locking means is threadedly received on the shaft and is sized to abut the blade holder around the aperture. The blade cover comprises a sleeve having a threaded aperture and a bolt sized to be threadedly received by the aperture. The bolt can thereby be tightened against a blade within the sleeve to secure the blade in the sleeve.

4 Claims, 4 Drawing Sheets

BLADE-CHANGING WORK TABLE AND BLADE COVER

BACKGROUND OF THE INVENTION

This invention relates to a work table on which blades on a pelletizer blade holder can be safely and conveniently changed. According to another aspect, the invention relates to a blade cover.

In a pelletizer, hot thermoplastic material is extruded through extrusion orifices in a die plate. The extruded material passes through the orifices in the form of hot thermoplastic rods and into a chamber which can have water circulating therein. The rods are cut into pellets by blades mounted on a rotating blade holder.

The blades must be periodically replaced. This involves first removing the blade holder from the rather cramped chamber which allows little room to maneuver the hands, leading inevitably to cuts and abrasions. The blade holder can then be placed on a table or held by a coworker while the blades are changed. This operation can also lead to cuts and abrasions because of the instability of the blade holder.

SUMMARY OF THE INVENTION

It is an object of the invention to provide a work table on which blades can be changed easily and safely.

It is also an object of the invention to provide a blade cover to further minimize the risk of injury.

One of the above objects is realized by a work table on which blades are changed on a pelletizer blade holder, wherein the blade holder has an aperture extending therethrough and the work table comprises: a tabletop; a means for supporting the tabletop; a shaft integrally connected to the tabletop and sized to fit within and through the aperture, the shaft being threaded along at least a portion of its length and being substantially parallel to the tabletop; a locking means for being threadedly received on the shaft and being sized to abut the blade holder around the aperture, whereby the blade holder can be locked into position on the shaft for having its blades changed.

The other object is realized by a blade cover comprising: a sleeve having a threaded aperture; a bolt sized to be threadedly received by the aperture, whereby the bolt can be tightened against a blade within the sleeve to secure the blade in the sleeve.

The blade cover clearly protects those working with the blade holder. The work table provides a stable support for the blade holder while its blades are changed easily and safely.

DETAILED DESCRIPTION OF THE INVENTION

Figure 1A:
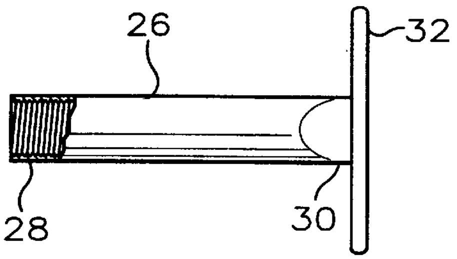
FIG. 1*a* is a side view of a locking member shown in FIG. 1 with a portion cut away to reveal internal threads.
Figure 1:
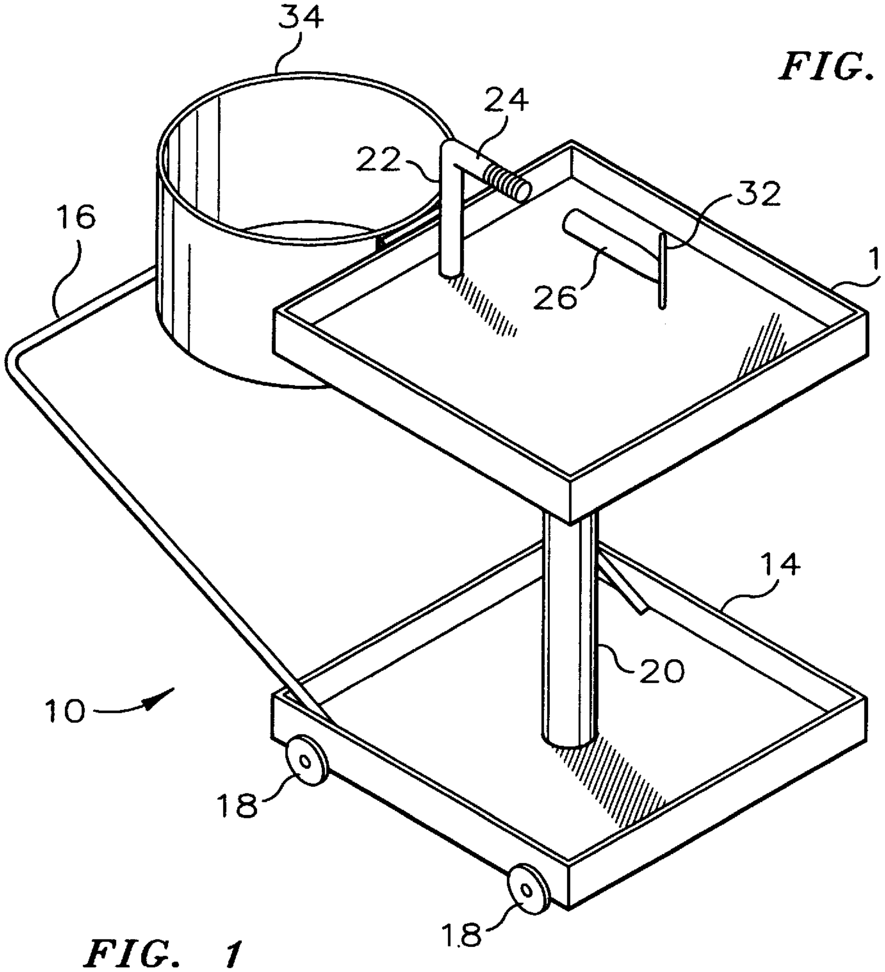
FIG. 1 is a perspective view of a work table in accordance with the invention.
Figure 7:
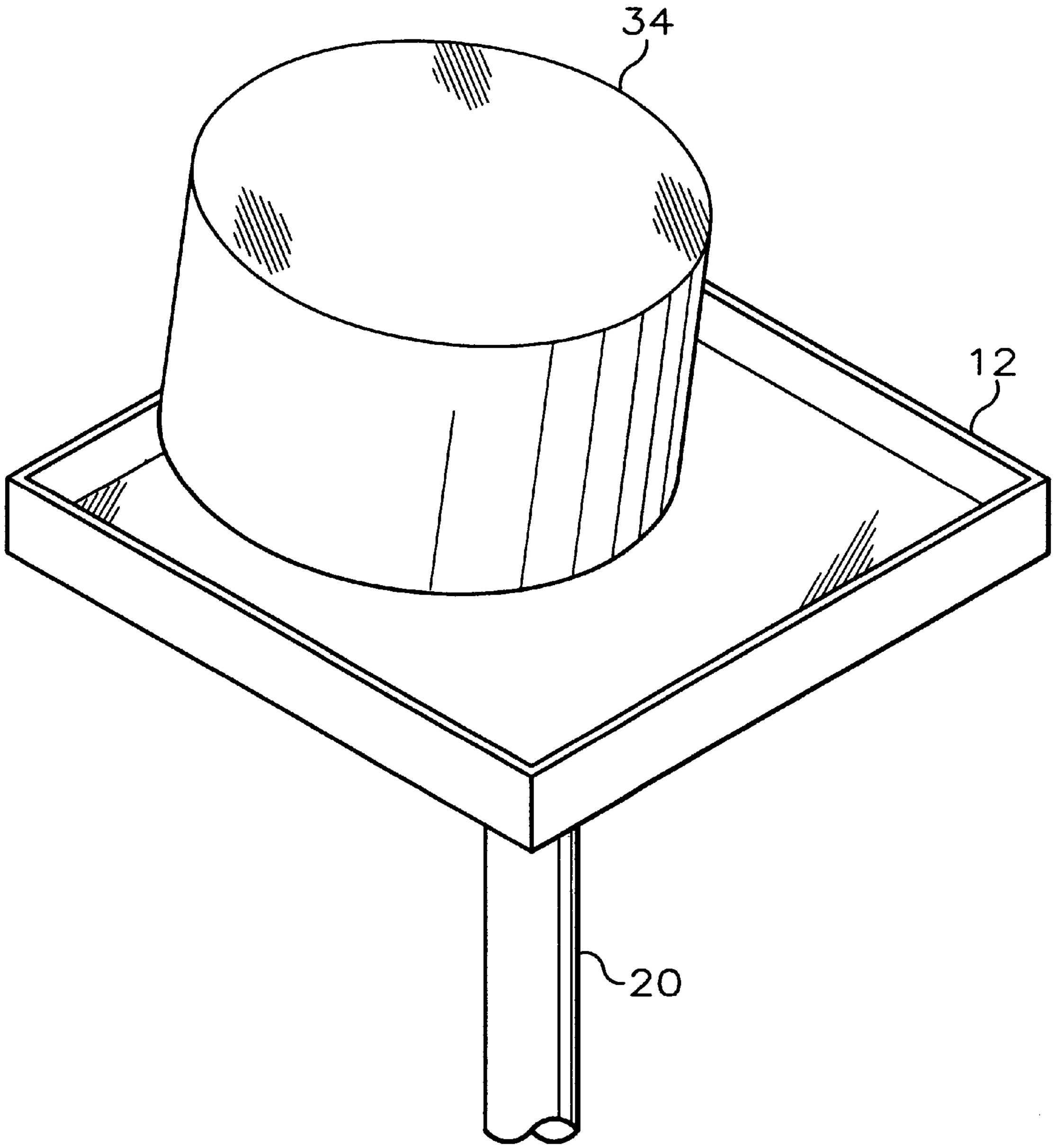
FIG. 7 is a perspective view of the work table as covered by a table cover.

Referring to FIG. 1, the illustrated work table 10 comprises: a tabletop 12; a base 14 having a handle 16 connected to one end and further having wheels 18 rotatably connected thereto which preferably have the capability of being locked in position; a rod 20 extending between and integrally connected to base 14 and tabletop 12; a support member 22 having one end integrally connected to tabletop 12 and an opposing end integrally connected to a shaft 24, wherein support member 22 is substantially perpendicular to tabletop 12 and shaft 24, and wherein shaft 24 is threaded along at least a portion of its length and is substantially parallel to tabletop 12; a locking member 26 comprising a tubular member having an open internally threaded end (FIG. 1*a*) 28 and an opposing end 30 to which is integrally connected a handle 32; and a table cover 34 hingedly connected to tabletop 12 and further explained with reference to FIG. 7.

Figure 2:
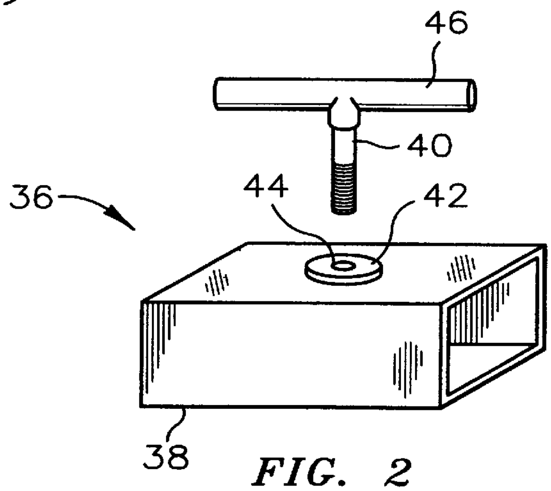
FIG. 2 is a perspective view of a blade cover in accordance with the invention.

Referring to FIG. 2, the illustrated blade cover 36 comprises a sleeve 38 and a bolt 40. In the illustrated embodiment, sleeve 38 has a polygonal cross section and four walls. A threaded member 42, which defines a threaded aperture 44, is mounted in or on one of the walls. Bolt 40 has a handle 46 integrally connected thereto so as to be substantially perpendicular to the bolt. Bolt 40 can be threaded into and through aperture 44 with the aid of handle 46 so as to be tightened against a blade within sleeve 38 to secure the blade in the sleeve.

With respect to materials of construction, work table 10 and blade cover 36 are primarily constructed from carbon steel.

Figure 3:
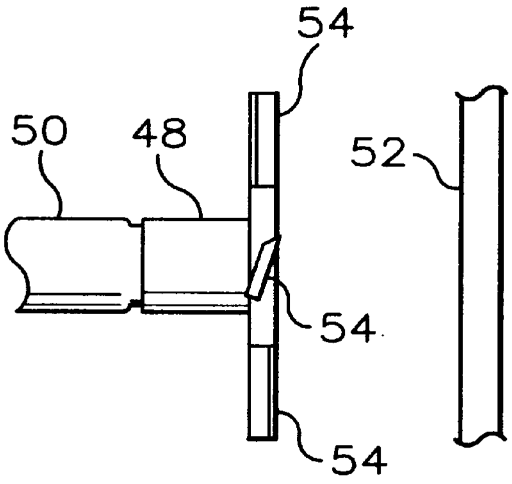
FIG. 3 schematically illustrates the blade holder, with uncovered blades, and a die plate in a chamber of a pelletizer.

Referring to FIG. 3, a blade holder 48 is shown as mounted on a shaft 50 in the chamber of a pelletizer. Blade holder 48 and shaft 50 have been shifted to the left of the normal operating position to provide the necessary clearance between blade holder 48 and die plate 52 to allow removal of blade holder 48 from shaft 50. This particular blade holder holds four blades 54 (one of which is not visible), but any number of blades could be employed.

Figure 4:
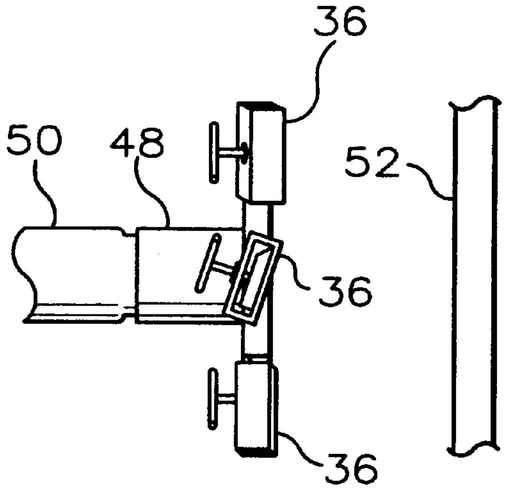
FIG. 4 is similar to FIG. 3 except that the blades on the blade holder have been covered with blade covers.

Referring to FIG. 4, the apparatus of FIG. 3 is shown after having the blades covered with blade covers 36. It is very desirable to cover the blades in this manner to avoid injury when removing blade holder 48 from shaft 50 and from the chamber.

Figure 5:
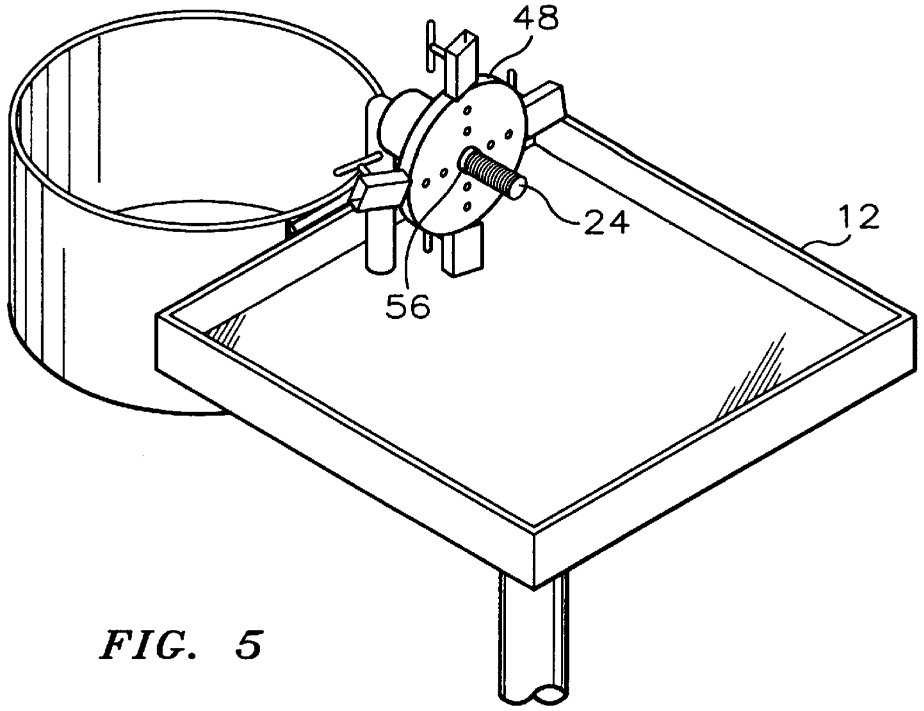
FIG. 5 illustrates the work table with a blade holder mounted thereon but not locked in position.

Referring to FIG. 5, after wheeling the work table to the pelletizer and removing blade holder 48 from the chamber, the blade holder, which has an aperture 56 therethrough, is placed onto shaft 24 as shown. Shaft 24 is sized to fit within and through aperture 56.

Figure 6:
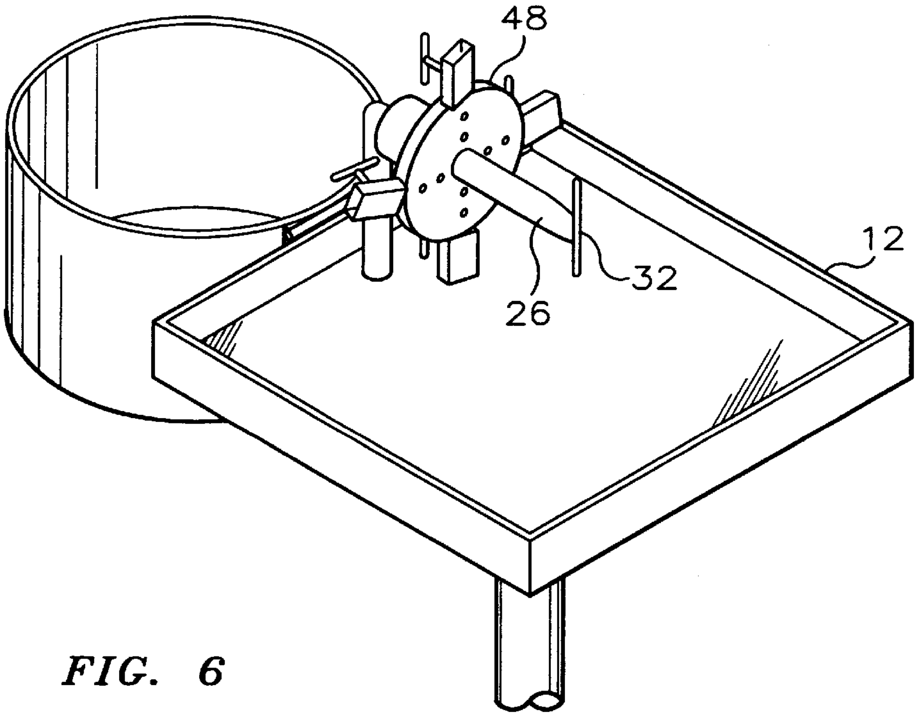
FIG. 6 illustrates the work table of FIG. 5 with the blade holder locked in position.

Referring to FIG. 6, the apparatus of FIG. 5 is shown after locking member 26 has been threaded onto the protruding end of shaft 24. Handle 32 assists such installation and also removal. Locking member 26 is sized to have its open end abut blade holder 48 around aperture 56.

Blade holder 48 as positioned in FIG. 6 is now ready to have its blades changed. The old covered blades are removed and the new blades, also covered, are mounted onto blade holder 48. Locking member 26 is then removed to allow removal of blade holder 48 from the work table. Blade holder 48 is now reinstalled into the chamber of the pelletizer, and the blade covers are removed.

It should be apparent that the work table and blade cover of the invention make blade changing an easy, convenient, and most importantly, safe procedure.

Referring to FIG. 7, table cover 34 is shown as covering the support member, the shaft, the locking member, and any blade holder locked in position on the work table. This provides an extra measure of safety whenever there are exposed blades on the blade holder, and the work table is left unattended.

Obviously, many modifications and variations of the present invention are possible in light of the above teachings. It is, therefore, to be understood that the invention may be practiced otherwise than as specifically described.

That which is claimed is:

1. A work table on which blades are changed on a pelletizer blade holder, wherein the blade holder has an aperture extending therethrough and the work table comprises:

a tabletop;

a means for supporting the tabletop;

a shaft integrally connected to the tabletop and sized to fit within and through the aperture, the shaft being threaded along at least a portion of its length and being substantially parallel to the tabletop;

a support member having one end integrally connected to the tabletop and an opposing end integrally connected to the shaft, the support member being substantially perpendicular to the tabletop and the shaft; and a locking means for being threadedly received on the shaft and being sized to abut the blade holder around the aperture, the locking means comprises a tubular member having an open internally threaded end, an opposing end, and a handle integrally connected to the opposing end to assist installation on and removal from the shaft, whereby the blade holder can be locked into position on the shaft for having its blades changed.

2. A work table as recited in claim 1 wherein the means for supporting the tabletop comprises a base and a rod extending between and integrally connected to the base and the tabletop.

3. A work table as recited in claim 2 further comprising wheels rotatably connected to the base and being capable of being locked in position.

4. A work table as recited in claim 3 further comprising a table cover hingedly connected to the tabletop for being selectively positioned to either not cover or cover the support member, shaft, and locking means, and any blade holder locked in position on the work table.

* * * * *